May 31, 1960 S. Z. AVEDIKIAN 2,938,771
METHOD OF MAKING HYPOSULFITES
Filed April 22, 1953
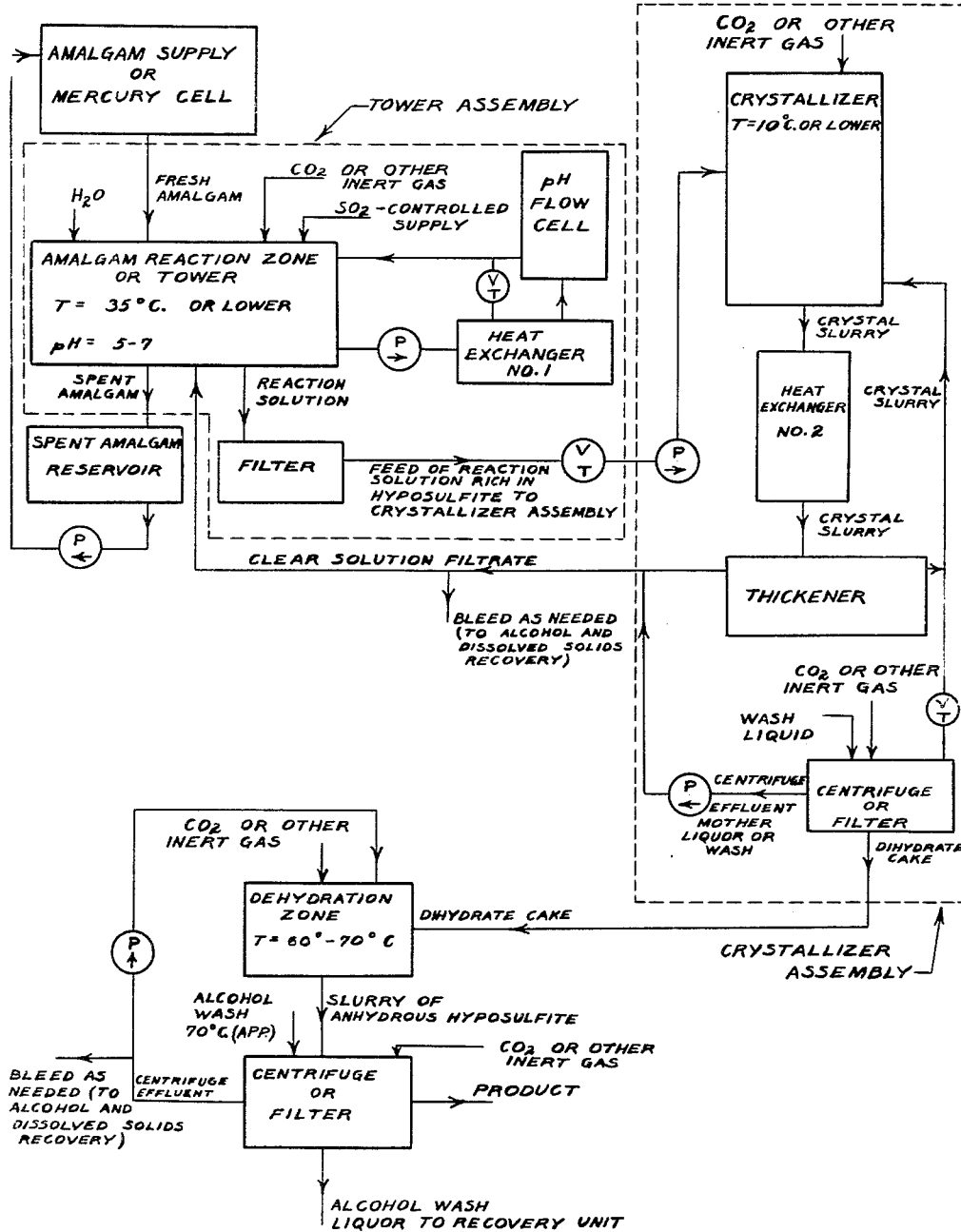
INVENTOR.
Souren Z Avedikian
BY Emery Varney
Whittemore & Dix
ATTORNEYS

United States Patent Office 2,938,771
Patented May 31, 1960

2,938,771

METHOD OF MAKING HYPOSULFITES

Souren Z. Avedikian, Larchmont, N.Y., assignor, by mesne assignments, of one-fourth to Joseph R. Ferry, South Orange, and one-fourth to Herbert C. Bugbird, Summit, N.J.

Filed Apr. 22, 1953, Ser. No. 350,497

9 Claims. (Cl. 23—116)

This invention relates to improvements in the manufacture of hyposulfites, for example, to the production of sodium hyposulfite, $Na_2S_2O_4$, known commercially as sodium hydrosulfite. More particularly, the invention relates to improvements in the manufacture of hyposulfites in accordance with the method disclosed in my Patent No. 2,576,769, issued November 27, 1951. In that method, the hyposulfite is made by the reduction of the bisulfite in aqueous medium by means of the amalgam of the metallic element the hyposulfite of which, it is desired to produce. Specifically, in the production of sodium hyposulfite, sodium bisulfite in aqueous medium is reduced by means of sodium amalgam to give the desired end product, namely, sodium hyposulfite.

This invention produces the hyposulfite by precipitating crystals of the hyposulfite from a reaction solution comprising the metal bisulfite, alcohol and water, in which the hyposulfite of the metal is dissolved as it is formed until its solubility is exceeded. Specifically, this invention produces sodium hyposulfite in the form of its dihydrate, $Na_2S_2O_4 \cdot 2H_2O$, in form suitable for subsequent treatment to produce the sodium hydrosulfite of commerce.

I have discovered that by including alcohol in the reaction solution, important advantages are obtained. One is that crystals begin to precipitate from the solution much more quickly when there is alcohol in the reaction solution. Another advantage is that in a system that uses a settling chamber for collecting the crystals, the separation of the crystals from the mother liquor proceeds more effectively in a solution containing alcohol.

Another advantage of the invention is that the alcohol in the solution inhibits decomposition of the hyposulfite and makes prompt removal of the crystals unnecessary.

Other objects, features and advantages of the invention will appear or be pointed out as the specification proceeds.

The drawing is a diagrammatic flow sheet showing the various steps of the process of this invention and the correlation of the different assemblies in which cyclic operations take place.

In order to produce sodium hyposulfite, in accordance with the process of this invention, I use sodium amalgam to reduce the bisulfite ion $(HSO_3)^-$, to hyposulfite ion, $(S_2O_4)^=$, in aqueous medium containing a substantial proportion of alcohol.

As disclosed in my Patent No. 2,576,769, if I use an amalgam containing a concentration of 0.04% sodium, by weight, namely, substantially that percentage of metallic sodium alloyed with or dissolved in 99.96% metallic mercury by weight, the sodium in the amalgam functions almost exclusively in reducing bisulfite to hyposulfite, in accordance with the following equation:

2Na(from sodium amalgam)+
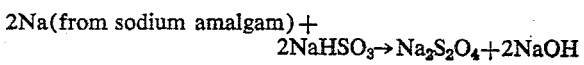

All references to percentages in the description that follows and the claims are by weight.

And as further disclosed, at a sodium concentration substantially greater than 0.04%, the sodium is spent in what I call the "water reaction," an unproductive reaction relative to hyposulfite, to produce sodium hydroxide and gaseous hydrogen with a resultant lowered yield of the desired end product. This water reaction is illustrated by the equation 2Na(from sodium amalgam)+$2H_2O \rightarrow 2NaOH + H_2$ (2)

Therefore, by keeping this unproductive "water reaction," as represented by Equation 2, at a minimum, yields of 90% and better have been obtained.

The various reactions taking place in the production of sodium hyposulfite, may be represented by the following equations:

2Na(from sodium amalgam)+
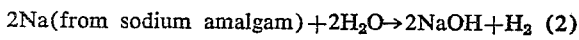

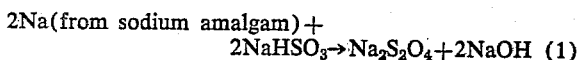

Summation of Equations 1 and 3 gives Equation 4.

2Na(from sodium amalgam)+
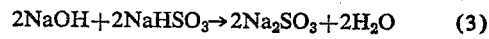

The regeneration of bisulfite takes place in accordance with Equation 5, below.

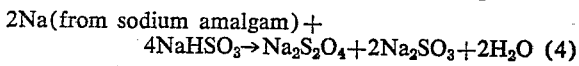

The sulfur dioxide may also be shown as neutralizing the sodium hydroxide formed (see Equation 6, below).

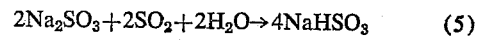

From a review of the description of my invention, it will be apparent that the process involves three reactions. The first is the reduction reaction which is the productive reaction of the process. This is represented by Equation 1, above, in which the sodium amalgam reacts with the sodium bisulfite in aqueous solution to produce the sodium hyposulfite and the by-products of sodium hydroxide and water. The second is the neutralization of the sodium hydroxide by the excess sodium bisulfite to give sodium sulfite and water. This is represented by Equation 3. The third is the regeneration reaction in which bisulfite is regenerated from the sulfite by furnishing an acidic substance to the system, for example, sulfur dioxide. This is represented by Equation 5. Summation of Equations 3 and 5 may be represented by Equation 6.

In the system as operated, it is probable that none of the reactions occur to the exclusion of any of the others and that all take place at some period of the process depending upon the pH at that time. There exists a definite ratio or relationship between bisulfite and sulfite at any pH. This relationship is approximately 9 to 1 sodium bisulfite to sodium sulfite at a pH of 5.5; whereas at a pH of 7.0, it is only about 1 to 6, indicating a very much reduced concentration of bisulfite ions. Since the productive reaction, represented by Equation 1 above, requires bisulfite ions $(HSO_3)^-$, it has been found advantageous to operate at a pH at which bisulfite ion concentration is high, and sulfite concentration is, therefore, correspondingly lower. Repetition of the cycle represented by these equations brings about enrichment of the reaction solution in respect to sodium hyposulfite, finally resulting in its precipitation when its saturation concentration is reached.

With this invention, in which the concentration of the sodium in the amalgam is kept at a very low value, there is very little water reaction, represented by Equation 2 above. The reason for this is not clearly understood except that it is believed that the lower concentration tends to enoble the sodium, thus reducing its tendency to extreme reactivity. By virtue of this enobling, it is rendered less sensitive to water but its reactivity with bisulfite does not appear to be impaired. The concentration of sodium in the amalgam can be as high as 0.04% without causing substantial loss of sodium by the water reaction. The percentage concentration can be increased slightly without producing a substantial waste of sodium, but as the concentration reaches approximately 0.10% of sodium, the waste of sodium becomes large.

The reaction between the sodium amalgam and sodium bisulfite is preferably carried out in a tower. It is not necessary that the tower be packed because small drops of amalgam, into which a stream of amalgam breaks upon passing or falling through a body of liquid, offer sufficient and adequate contact with the liquid in the tower when the tower is of sufficient height or length. A packed tower can be used, if desired. The spent amalgam, that is, amalgam which has a substantially lower sodium concentration that the amalgam initially supplied to the tower, collects in a suitable trap at the base of the tower, said trap having the shape of a U, and finally discharges into a spent amalgam reservoir from which this amalgam is taken to make new amalgam enriched in sodium content. Thereupon, the cycle of flow is renewed so that every part of the mercury acquires new sodium, thus becoming fresh amalgam, loses it upon contact with bisulfite in the reaction solution to form hyposulfite and thus becomes spent amalgam, after which it is ready once more to become enriched in sodium content to become fresh amalgam. This phase represents the mercury or the amalgam cycle of my process.

Contact between all sections of the reaction solution and the amalgam is achieved by circulation of the reaction solution within the tower assembly so that fresh solution, rich in bisulfite, is continually exposed to the action of sodium in the amalgam. In this circulation, the acidity of the reaction medium is controlled within specified limits by furnishing to the reaction solution an acidic substance, of such character which will not cause sharp changes in acidity but will regenerate the bisulfite. Such an acidic substance is acetic acid. For purposes of my process, however, the most advantageous source of acidity is sulfur dioxide, which functions in accordance with the reaction represented by Equation 5. Sulfur dioxide gas is supplied from a controlled source, e.g., an automatic valve controlled by a pH meter, to the surface of the reaction solution. I prefer to operate the system under a slight pressure in order to facilitate dissolution of the gas in the reaction solution by surface absorption. The higher the pressure, the greater the amount that will dissolve and the more rapid the rate of dissolution.

The entire system is maintained under a slight pressure of an inert gas such as carbon dioxide at all times. It is the preferred embodiment of this invention to maintain the tower assembly and the crystallizer assembly at approximately the same pressure maintained by the said inert gas, these pressures being controlled by a diaphragm type pressure regulator. The introduction of sulfur dioxide into the existing carbon dioxide atmosphere assists the dissolving of the sulfur dioxide in the reaction solution without creating unduly strong local acidity conditions.

The furnishing of sulfur dioxide in the vapor phase above the reaction solution makes possible convenient control of pH at approximately 5 to 6 or at a maximum of 7. With the alcohol in the system, the process can tolerate greater acidity than when carried out with no alcohol present. This allows somewhat more latitude in the control of the sulfur dioxide supply, or any other material that is used to regenerate the bisulfite or to neutralize the sodium hydroxide formed.

The alcohol used is preferably ethyl or methyl or a mixture of the two. Other alcohols can be used, such as butyl, propyl and isopropyl, but the higher alcohols have the disadvantage of higher cost. The alcohol may be denatured, as by the addition of a small amount of a ketone, or other ingredient which does not react with the active ingredients of the reaction solution. The amount of alcohol used depends upon the various conditions including the concentration of bisulfite in the solution. The percentage of alcohol should not be such as to cause precipitation of the bisulfite. The preferred reaction solution comprises bisulfite—10%; sulfite—2%; alcohol—20%; and the balance water. The combined bisulfite and sulfite concentration can be within a range of about 5% to about 20%. The alcohol content of the reaction solution can be less than 20% but lower concentration permits more of the hydrosulfite to dissolve. Higher concentrations of alcohol can be used so long as the concentration does not approach that at which there is danger of precipitating the sulfite or bisulfite.

I prefer to maintain the tower assembly at a temperature of 35° C. or lower and the crystallizer assembly at a temperature of 10° C. or lower. The latter assembly comprises a crystallizer, a heat exchanger which functions to cool the reaction solution to the desired lower temperature than that which exists in the tower assembly, a thickener or a settler in which concentration of crystals of sodium hyposulfite dihydrate is brought about, and a centrifuge or filter in which these crystals are separated from the reaction solution.

The centrifuge effluent and the clarified solution from the settler, or thickener, are returned to the tower assembly. The concentration of hyposulfite in this clarified solution is lower than the concentration of hyposulfite in the solution fed from the tower assembly to the crystallizer assembly. After return to the tower assembly, the solution becomes enriched with new hyposulfite. Under these conditions of operation, crystals precipitate out of solution in the crystallizer assembly as practically pure dihydrate of sodium hyposulfite. This crystallization or precipitation takes place primarily in the crystallizer, but may occur as well throughout the crystallizer assembly. As stated above, I maintain an inert atmosphere slightly higher than atmospheric pressure above the liquid contents of the crystallizer assembly.

The crystals come out of solution at a substantially lower concentration of sodium hyposulfite as a result of the presence of the alcohol in the reaction solution. The alcohol decreases the solubility of the sodium hyposulfite and with about 20% of alcohol (by weight) saturation occurs at concentration of approximately 3 or 4%; thus there is less hyposulfite in the solution which circulates through the system. Since hyposulfite is unstable in solution, a reduction of the amount of hyposulfite in solution in the system reduces such losses as occur from decomposition, and thereby increases the efficiency of the process. Even more important, however, is the effect of the alcohol in inhibiting decomposition of the hyposulfite. This effect is sufficient to permit the system to be shut down over night, or even longer, without serious decomposition of the hyposulfite.

The crystals of hyposulfite which are formed, as described above, are removed from the solution by means of a centrifuge or filter, preferably a centrifuge.

Hyposulfite produced by amalgam processes have contained traces of mercury, and it is generally reported that the mercury content has averaged approximately 0.002%, by weight. I have found that the amount of mercury present in the hyposulfite can be substantially reduced by restricting the turbulence of the mercury in the reaction zone through a feeding of the mercury as disclosed in my Patent No. 2,576,769; and that still further reduction in mercury content can be obtained by the inclusion of a micro-metallic filter through which the reaction solution is fed to the crystallizer assembly. This filter is utilized as insurance to prevent carryover of mercury. With these expedients, the traces of mercury in the hyposulfite have been reduced to not more than 0.001%, by weight. For uses in which it is desirable that the sodium hyposulfite contain little or no trace of mercury, a carboxylic-type cation exchanger may be placed in the feed line between the tower assembly and the crystallizer assembly.

If the water reaction represented by Equation 2 occurs at all, no matter how small, the concentration of bisulfite in the system tends to increase with time, because the sodium hydroxide formed in the water reaction is neutralized by sulfur dioxide as represented by Equation 6 above. For optimum results in the operation, and production of dihydrate crystals, it is desirable to maintain the concentration of bisulfite in the reaction solution as nearly constant as possible. In this way, precipitation of dihydrate in the reaction solution, and its removal from the system, are greatly facilitated. This increase in concentration increases the specific gravity of the reaction solution and leads to difficulties in crystallization and separation of crystals.

I have found that the simplest way to maintain the concentration of bisulfite constant is by removing, as by periodic bleeding, a certain amount of reaction solution from the system. The quantity that is bled is replaced with a solution comprising alcohol and water in which the alcohol content is approximately 20%, by weight.

When conditions of operation are such that a substantial quantity of reaction solution remains in the centrifuge cake, it is desirable to remove this adhering reaction solution, which contains dissolved sodium bisulfite and sulfite, in order to obtain a dihydrate cake of greatest purity. This is accomplished advantageously by displacement washing of the centrifuge cake in the centrifuge, with a wash liquid which contains approximately 50% alcohol and 50% water.

The effluent from this displacement washing can be fed to the system as replacement of the solution bled from the system for removal of excess bisulfite. However, inasmuch as the alcohol content of this wash effluent is greater than the desired 20%, the proper amount of additional water is supplied at approximately the same time that the wash effluent is fed to the system, together with sufficient water to replace the water of crystallization removed by the dihydrate.

The centrifuge cake from this process is sodium hyposulfite dihydrate of maximum purity. Because of the high purity of this product, it is more advantageously amenable to a cyclic type of dehydration than are the hyposulfites produced by other processes. The dihydrate cake is transferred to a dehydration zone maintained at a temperature of 60° to 70° C. This dehydration zone, as well as other parts which take part in the dehydration operation, are maintained under an inert atmosphere of carbon dioxide or other inert gas.

The dehydration zone includes a dehydration solution which consists essentially of a saturated solution of sodium chloride containing alcohol of not more than 50%, by weight, and an alkalizing agent. For the alkalizing agent, I use material such as sodium hydroxide, sodium bicarbonate, sodium carbonate, sodium sulfite, ammonium hydroxide, tetrasodium borate, and the like, in sufficient quantity to neutralize any bisulfite, not removed by the displacement wash of the dihydrate cake, and to maintain an alkaline condition during the dehydration operation. A pH greater than 7 is desired, preferably below 10.

The dehydration under these conditions of operation takes place within two to ten minutes, although even less than two minutes has been found sufficient for adequate dehydration and the production of anhydrous hyposulfite. The progress of dehydration can be followed visually. The fine, needle-like crystals of dihydrate change into the granular, sandy, anhydrous form when the phase change takes place. The slurry of anhydrous hyposulfite in the dehydrating solution is filtered or centrifuged in order to separate the anhydrous hyposulfite from the dehydrating solution. The filter or centrifuge effluent from this operation is returned to the dehydration zone for dehydration of additional hydrated hyposulfite. The anhydrous product on the filter or centrifuge is washed with alcohol at a temperature of approximately 70° C., preferably by displacement, and the product dried on the filter or centrifuge. The application of heat by means of infra red lamp, or its equivalent, assists in this drying operation.

In the preferred embodiment of my invention, I treat approximately 200 grams of dihydrate cake, which contains approximately 50% dihydrate crystals and 50% of a mixture of wash alcohol and mother liquor, with approximately 25% sodium chloride solution which in addition contains approximately 2½% sodium hydroxide and to which I add an additional alkalizing agent in the form of 7 grams of sodium bicarbonate. By this method of dehydration, I can produce an anhydrous sodium hyposulfite which has a purity better than 90%, and which is extremely stable in storage.

The process of the invention has been described in detail for sodium hyposulfite. Potassium hyposulfite, lithium hyposulfite, or any alkali metal hyposulfite can be produced by the method of this invention by merely substituting the bisulfite of the desired alkali metal for sodium bisulfite and the amalgam of the desired alkali metal.

I can also use this method to produce zinc hyposulfite. In order to produce zinc hyposulfite in accordance with this invention I can use zinc amalgam, or zinc dust, whichever is obtainable at a lower price, and is more economical at the time. The advantages of greater stability of reaction solution, ease of operation and flexibility apply to zinc hyposulfite, as well, when alcohol is made a part of the reaction solution.

The subject matter of this application is related to applicant's co-pending application, Serial No. 211,656, filed February 19, 1951, now abandoned. Other changes and modifications can be made in the process without departing from the invention as defined in the claims.

What is claimed is:

1. The method of making an alkali metal hyposulfite which comprises passing an amalgam of the alkali metal of a predetermined and controlled concentration through an aqueous solution of the bisulfite of the alkali metal in a reaction zone and to a collection region, forming dissolved hyposulfite of the alkali metal in the aqueous solution by reaction of the alkali metal of the amalgam with the bisulfite in the reaction zone, withdrawing the amalgam at lower alkali metal concentration from the collection region for enrichment and recirculation through the aqueous solution, withdrawing aqueous solution from the reaction zone at another region and passing the withdrawn solution to a crystallization region, cooling the solution after it leaves the reaction zone to a temperature below the alkali metal hyposulfite saturation temperature of the solution and by said cooling precipitating crystals of the hyposulfite in the crystallization region, passing the remaining solution from the crystallization region back to the reaction zone in a closed cycle and for enrichment with additional hyposulfite in the reaction zone, raising the temperature of the solution after it leaves the crystallization region and before its enrichment with additional hyposulfite, reducing the viscosity of the circulating solution and the concentration of hyposulfite required for saturation in the crystallization region and through the cycle by circulating with the solution and in intimate mixture therewith a quantity of alcohol sufficient to substantially reduce the solubility of the hyposulfite in the solution, and maintaining the quantity of alcohol in circulation below the value that precipitates the bisulfite from the solution within the temperature range through which the solution passes during its cycle of circulation.

2. The method of making an alkali metal hyposulfite, as described in claim 1, with the amalgam that is passed through the aqueous solution having an alkali metal concentration less than 0.1%, and the proportion of alcohol in the solution is less than about 20%, the percentages being by weight.

3. The method of making an alkali metal hyposulfite, as described in claim 1, and in which the reaction solution in the crystallization region is cooled to a temperature at least as low as 10° C. to precipitate crystals of the hyposulfite, and a slurry of the crystals is removed from the mother liquor by centrifuging and in which the centrifuge cake is thereafter washed to remove mother liquor that remains on the surface of the crystals, and the cake is centrifuged while washing to obtain a displacement washing of the crystals.

4. The method of making an alkali metal hyposulfite, as described in claim 3, and in which the centrifuge cake is washed with alcohol and water and the wash liquid, with its dissolved mother liquor from the cake, is supplied to the solution circuit.

5. The method of making an alkali metal hyposulfite, as described in claim 1, and in which the solution is cooled to form a slurry at the crystalization region, the slurry is withdrawn to a by-pass circuit in which crystals are removed from the mother liquor and the mother liquor is circulated back to the closed circuit which includes the reaction and crystallization regions.

6. The method of making an alkali metal hyposulfite, as described in claim 1, and in which the alkali metal is sodium and the aqueous solution is a solution of sodium bisulfite.

7. The method of making sodium hyposulfite, as described in claim 6, and in which sulfur dioxide is dissolved in the aqueous solution to convert sodium sulfite which forms as a by-product of the reaction in the body of solution back into sodium bisulfite which reacts with the sodium amalgam to produce additional sodium hyposulfite.

8. The method of making sodium hyposulfite, as described in claim 6, and in which the surface of the reacted solution is subjected to an atmosphere of sulfur dioxide, and the sulfur dioxide is under superatmospheric pressure to increase the quantity of the sulfur dioxide that is dissolved in the body of solution to convert sodium sulfite, which is formed by the reaction, into additional sodium bisulfite for reacting further with the sodium of the amalgam, maintaining the body of solution at a temperature at least as low as 35° C., and maintaining the pH of the mixture at approximately 5 to 6.

9. In the process of making alkali metal hyposulfite by reacting an alkali metal amalgam on a solution of alkali metal bisulfite, the step of reacting the amalgam with bisulfite in a hydroalcoholic solution containing about 20% of a lower aliphatic alcohol by weight.

References Cited in the file of this patent

UNITED STATES PATENTS

| | | |
|---|---|---|
| 1,676,277 | Mumford | July 10, 1928 |
| 1,997,277 | Burke et al. | Apr. 9, 1935 |
| 2,010,615 | Vanderbilt | Aug. 6, 1935 |
| 2,084,651 | Mecklenburg | June 22, 1937 |
| 2,576,769 | Avedikian | Nov. 27, 1951 |

FOREIGN PATENTS

| | | |
|---|---|---|
| 8,816 | Great Britain | of 1905 |
| 23,515 of 1904 | Great Britain | June 29, 1905 |
| 247,524 | Great Britain | Aug. 26, 1926 |

OTHER REFERENCES

Myers: "Ion Exchange Resins, New Tools for Industry," Industrial and Engineering Chemistry, vol. 35, No. 8, August 1943, pages 858–863.